United States Patent [19]
Trapp

[11] 3,758,169
[45] Sept. 11, 1973

[54] SNOWMOBILE IDLER WHEEL MOUNTING
[75] Inventor: Robert Lee Trapp, Horicon, Wis.
[73] Assignee: Deere & Company, Moline, Ill.
[22] Filed: Nov. 22, 1971
[21] Appl. No.: 201,097

[52] U.S. Cl. ..................... 305/32, 180/5 R, 308/29
[51] Int. Cl. ............................................. B62m 27/00
[58] Field of Search .................. 180/5; 305/31, 32; 308/28, 29

[56] References Cited
UNITED STATES PATENTS

| 3,674,103 | 7/1972 | Kiekhaefer | 180/5 R |
| 2,826,464 | 3/1958 | Hawk | 305/28 X |
| 3,474,751 | 10/1969 | Hebert | 180/5 R |
| 3,548,961 | 12/1970 | Newman | 180/5 R |

FOREIGN PATENTS OR APPLICATIONS

| 272,104 | 6/1969 | Austria | 180/5 R |

Primary Examiner—Richard J. Johnson
Attorney—H. Vincent Harsha et al.

[57] ABSTRACT

A snowmobile has an inverted U-shaped main frame with opposite depending side walls and an endless flexible track disposed between the side walls and connected to the main frame by a bogie wheel track suspension system and a rear idler wheel assembly, which includes a transverse pivot shaft having its opposite ends mounted for fore-and-aft adjustment on the opposite side walls, a pair of arms swingably mounted on the shaft and carrying a transverse axle on which a number of idler wheels are mounted, the rearward end of the track being trained around the idler wheels. The axle has its opposite ends journaled in bearings carried by the opposite arms in bearing retainers removably attached to the arms, and annular rubber bushings are mounted in the bearing retainers between the retainers and the bearings.

2 Claims, 4 Drawing Figures

3,758,169

SNOWMOBILE IDLER WHEEL MOUNTING

BACKGROUND OF THE INVENTION

This invention relates to a snowmobile and more particularly to an improved rear idler assembly, which includes a number of transversely spaced coaxial idler wheels engaging the inner surface of the rearward end of the track. It is well known to mount the idler wheels on a transverse shaft, which is carried on a pair of vertically swingable arms pivotally connected to the rearward end of the main snowmobile frame on opposite sides of the track by means of a transverse pivot shaft, the arms being biased downwardly toward the ground by a torsion spring. It is also known to provide for fore-and-aft adjustment of the mechanism for mounting the idler wheels, to vary the track tension. It is further known to mount the opposite ends of the idler wheel mounting shaft or axle in bearings carried by the swingable arms. However, heretofore, some problems have been experienced in mounting the shaft in the bearings, due to misalignment of the bearings.

SUMMARY OF THE INVENTION

According to the present invention, improved means are provided for mounting the idler wheels on the main snowmobile frame. More specifically, the idler wheels are mounted on a transverse axle having its opposite ends supported in bearings mounted in rubber bushings, which in turn are mounted in retainers removably secured to vertically adjustable arms. An important feature of the invention resides in the fact that the rubber bushings permit some misalignment of the bearing retainers, thereby facilitating the assembly of the machine. Another feature resides in the fact that the bearing retainers are easily removable to permit easy removal of the shaft on which the idler wheels are mounted. Still another feature of the invention resides in the fact that the rubber bushings are capable of absorbing some of the shock exerted on the idler wheels as the machine moves over rough terrain.

DESCRIPTION OF THE PREFERRED EMBODIMENT

Figure 1:
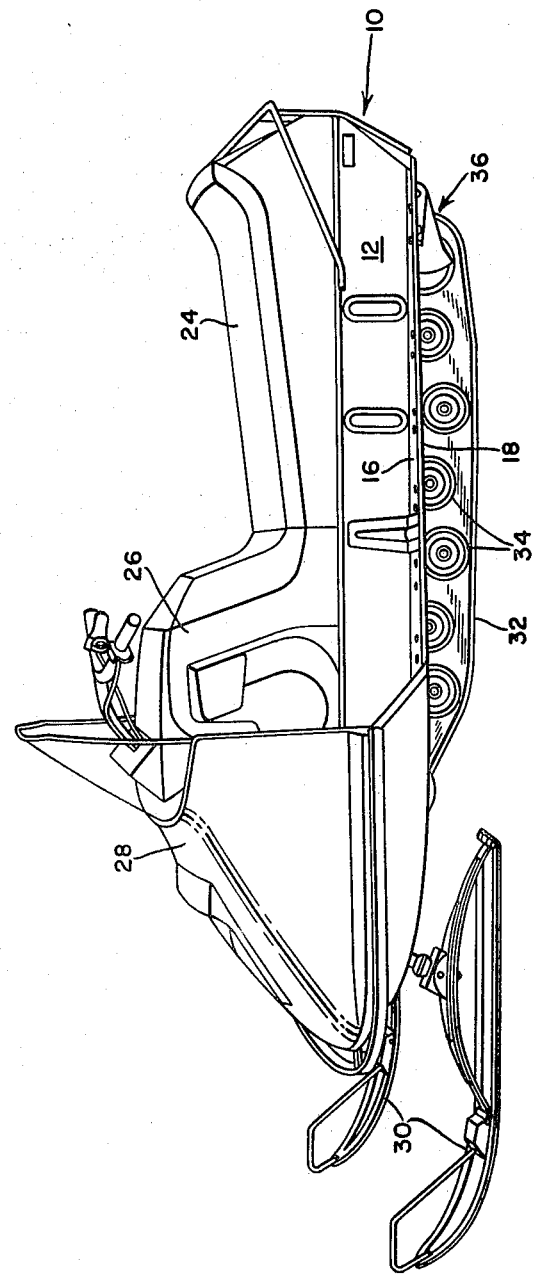
FIG. 1 is a left side perspective view of a snowmobile embodying the invention.
Figure 2:
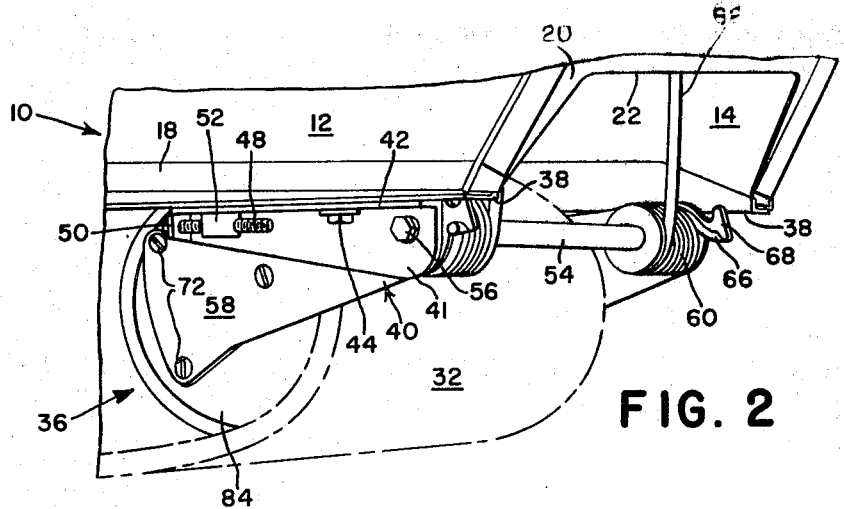
FIG. 2 is a left rear perspective view of the lower rear portion of a snowmobile, showing the rear idler wheel mounting.

The invention is embodied in a snowmobile having a fore-and-aft, channel-shaped main frame 10, of generally inverted U-shaped cross section, such main frames being conventional on snowmobiles. The main frame has depending left and right side walls 12 and 14, respectively, the lower end of the side walls having laterally outwardly extending footrest portions 16, with vertical flanges 18 outwardly of the side wall, only the left side footrest portion being shown in the drawings. A generally upright rear wall 20 extends between the rear ends of the left and right side walls 12 and 14 and includes an inverted U-shaped opening 22.

Mounted on top of the rearward portion of the main frame is a seat 24, and an engine enclosure 26 is mounted on the main frame forwardly of the seat, the forward portion of the engine enclosure being formed by a hood 28. The front of the machine is supported on a pair of steerable skis 30, while the rear end is supported on an endless flexible drive track 32, only the lower, ground-engaging run of which is shown in FIG. 1, the upper run being disposed in the channel-like main frame 10 between the side walls 12. The forward end of the drive track is trained around a drive pulley (not shown) in a conventional manner, and the drive pulley in turn is driven by the engine through a transmission. The main frame is supported on the track by a bogie wheel track suspension system, which includes a plurality of bogie wheel assemblies 34, having a plurality of bogie wheels biased downwardly against the inner surface of the lower, groundengaging track run to provide a flexible suspension for the main frame. The track suspension system also includes a rear idler wheel assembly, indicated in its entirety by the numeral 36, about which the rear end of the track is trained.

A pair of fore-and-aft extending reinforcing members 38 having an L-shaped cross section are attached to the lower edges of the side walls 12 and 14, the upright portions of the reinforcing members being disposed interiorly adjacent to the side walls, while the horizontal leg of each reinforcing member underlies the footrest portion 16 of each side wall. The rear idler assembly 36 includes a pair of mounting brackets 40 respectively attached to the main frame at the rear and lower ends of the opposite side walls below the reinforcing members 38. The mounting brackets are generally L-shaped and extend in a fore-and-aft direction, each mounting bracket including a vertical leg 41 and an outwardly extending horizontal leg 42. The horizontal legs are removably attached to the undersides of the respective reinforcing members by a pair of fasteners 44, here shown as bolt-and-nut-type fasteners, the bolts of which extend upwardly through fore-and-aft elongated slots 46 in the horizontal leg and through appropriate bores in the reinforcing member and the footrest portion of the side wall. When the fasteners 44 are tightened, the mounting bracket is locked to the underside of the reinforcing member 38, while, when the fasteners are loosened, the mounting bracket is free to slide in a fore-and-aft direction relative to the reinforcing member until the opposite ends of the slots engage the bolt. A fore-and-aft extending adjusting bolt 48 extends rearwardly through an apertured ear 50 at the forward end of the mounting bracket and through a threaded trunnion 52, which forms the head of the forward fastener 44. As is apparent, the mounting bracket 40 can be adjusted in a fore-and-aft direction when the fasteners 44 are loosened by simply turning the bolt 48.

Figure 3:
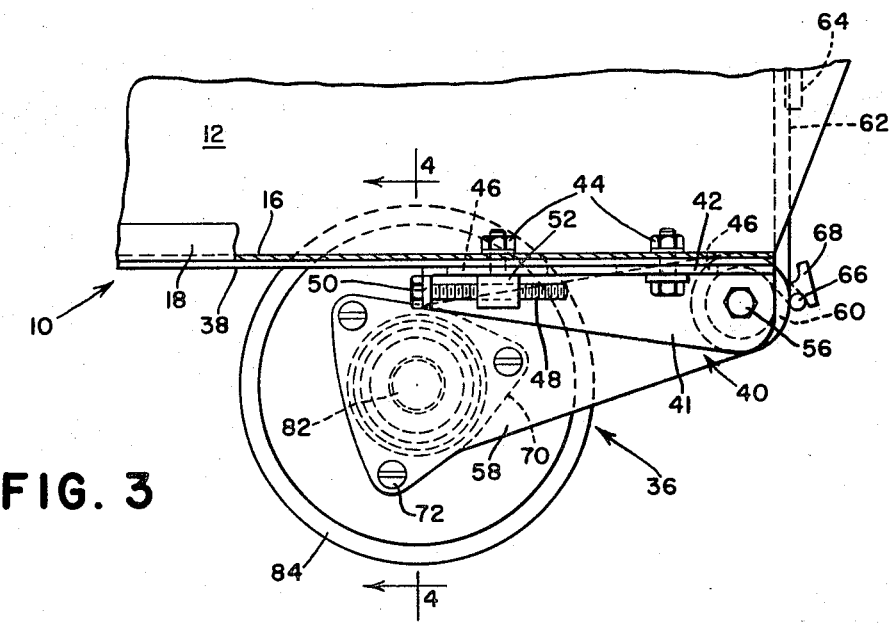
FIG. 3 is a side elevation view of the lower rear portion of the snowmobile, with the track removed and a portion of the footrest removed to more clearly disclose the idler wheel mounting.

A transverse pivot shaft 54 spans the rearward end of the main frame and has its opposite ends mounted on the opposite brackets 40 by bolts 56 extending through the brackets and threaded into the ends of the pivot shaft 54. A pair of vertically swingable arms 58 are respectively mounted on the pivot shaft 54 adjacent to the opposite mounting brackets 40, and a pair of helical-type torsion springs 60 are coaxially disposed on the pivot shaft 54 adjacent to the arms 58, the inner ends 62 of the torsion springs extending upwardly in a tangential direction and engaging a bracket 64 above the rear wall opening 22. The outer ends 66 of the torsion springs extend in a transverse direction and respectively engage abutments 68 on the arms 58, so that the force exerted by the torsion springs tends to rotate the arms 58 downwardly or in a counterclockwise direction, as viewed in FIG. 3.

Figure 4:
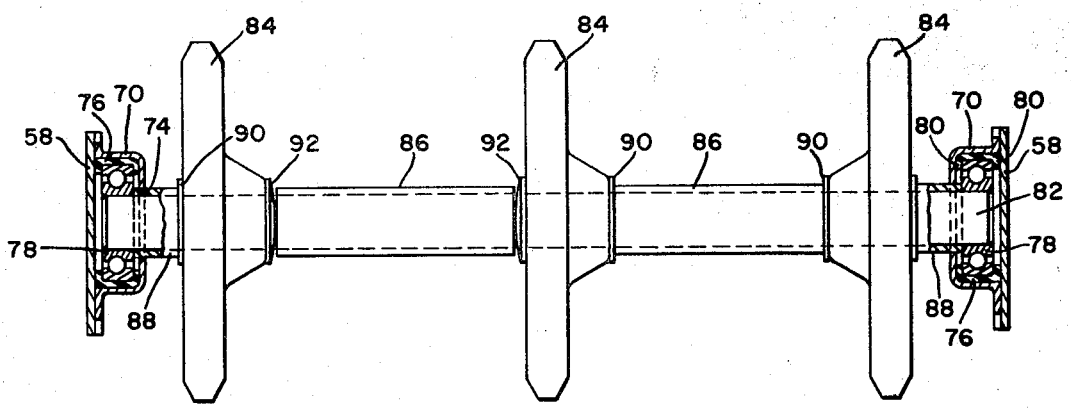
FIG. 4 is a section viewed generally along the line 4—4 in FIG. 3.

A cup-shaped bearing retainer 70 is removably attached to the inner surface of each arm 58 by removable fasteners 72. As best seen in FIG. 4, each bearing retainer forms a generally cylindrical recess with a circular opening 74 on the inner wall, the circular openings 74 of the opposite bearing retainers being in general axial alignment. Mounted within each bearing retainer 70 is an annular rubber bushing 76 and a bearing 78 is mounted within each bushing 76. As is apparent, the outer cylindrical surface of the bushing engages the inner cylindrical surface of the bearing retainer, while the inner surface of the bushing tightly engages the outer cylindrical surface of the bearing. As shown in FIG. 4, the bushings have a generally U-shaped cross section, the bight portion of which lies between the outer surface of the bearing and the inner surface of the retainer, while the opposite leg portions form radial lips 80, the inner lip being disposed between the retainer wall and the bearing, while the outer lip is disposed between the bearing and the inner surface of the arm 58. The bushing is preferably made of an extruded rubber strip which is wrapped around the bearing during the assembly process.

A transverse axle shaft 82 has its opposite ends journaled in the opposite bearings 78 and three idler wheels 84 are mounted on the axle shaft 82, the outer two idler wheels being spaced from the center idler wheel by a pair of sleeve-like spacers 86, while the outer wheels are spaced from the respective bearings 78 by sleeve-like end spacers 88, which extend through the openings 74 in the bearing retainers 70. Appropriate washers 90 are provided between the spacers and the idler wheels, and preferably at least two of the washers are spring-type washers 92.

The wheels are assembled on the axle shaft 82 and the axle shaft is assembled in the bearings 78 by first pressing the center idler wheel less than half the length of the shaft, and then assembling the washer 90 and the right center spacer 86 on the shaft, after which another washer 90 and a second idler wheel is placed on the shaft followed by another washer 90 and an end spacer 88. The bearing 78 is then assembled into one of the rubber bushings 76, the bearing retainer 70 is placed around the end of the shaft, and the bearing is pressed onto the shaft until the end of the bearing is flush with the end of the shaft, the stacked washers, spacers, and idler wheel moving down on the shaft, and the bushing sliding into the retainer. The shaft is then reversed, and the other center spacer 86 is mounted on the shaft between a pair of spring washers 92, following which the other idler wheel 84 is mounted on the shaft, and another washer 90, and the other end spacer 88 is placed on the shaft, followed by the other bearing retainer 70. The other bearing 78 is then assembled into its rubber bushing, and the bearing is pressed onto the shaft, with the bushing sliding into the retainer, until the bearing is flush with the end of the shaft, the spring washers 90 compensating for the tolerances in the stacked components.

After the above assembly procedure, the bearing retainers 70 are attached to the respective arms. As is apparent, the rubber bushings will deflect to permit a limited degree of rocking of the bearings within the retainers, so that any misalignment between the bearing retainers on the opposite arms can be compensated for. As is also apparent, the above assembly procedure construction permits simple installation and removal of the idler wheels on the mounting arm. Also, the entire idler wheel assemblies can be adjusted in a fore-and-aft direction relative to the main frame to adjust the track tension.

I claim:

1. In a snowmobile having a main frame with depending opposite side walls and an endless flexible track having an upper run disposed between the side walls and a lower ground-engaging run, the combination therewith of an improved rear idler assembly comprising: a transverse pivot shaft; means mounting the opposite ends of the pivot shaft to the opposite side walls adjacent to the rearward end of the main frame; a pair of arms respectively mounted on the opposite ends of the pivot shaft and swingable in a vertical arc thereon; a pair of bearing retainers respectively removably mounted on the opposite arms and having generally cylindrical axially aligned recesses; a pair of annular resilient bushings respectively coaxially disposed in the recesses; a pair of opposite, coaxially aligned bearings respectively mounted within the bushings; a transverse axle shaft having its opposite ends journaled in the opposite bearings; a plurality of idler wheels mounted on the axle shaft and engageable with the inner surface of the belt at its rearward end; a plurality of washers and spacers mounted on the axle shaft between the adjacent idler wheels and on the opposite ends of the axle shaft between the idler wheels and the bearings, the stacked bearings, idler wheels, spacers, and washers on the axle shaft being equal in length to the shaft, at least one of said washers being a deflectable metallic spring washer to vary its thickness and take up tolerances; and spring means operatively associated with the arms for biasing the arms and the axle shaft and idler wheels carried thereon downwardly.

2. In a track vehicle having a main frame and an endless flexible track, the combination therewith of an improved idler wheel assembly comprising: a transverse pivot means carried by the main frame; a pair of parallel arms mounted on the pivot means; a pair of cup-shaped bearing retainers with outwardly extending flanges respectively removably mounted on the arms and having generally cylindrical axially aligned recesses, each bearing retainer having an open end covered by the arm and an axial bore in the end opposite the open end; a pair of generally coaxially aligned bearings respectively mounted in the bearing retainers, and having cylindrical outer surfaces; an annular bushing of resilient flexible material coaxially interposed between and engaging the outer cylindrical surface of each bearing and the inner surface of the retainer recess, the bushing having two radially inwardly extending lips on opposite sides of the bearing respectively between the arm and the bearing and between the end of the retainer and the bearing and being deflectable to permit a small degree of axial misalignment between the bearings and bearing retainers; an axle shaft having its opposite ends respectively extending through the retainer bores and journaled in the opposite bearings; and at least one idler wheel mounted on the axle shaft and engageable with the inner surface of the track.

* * * * *